US012469299B2

(12) United States Patent
Ishii et al.

(10) Patent No.: US 12,469,299 B2
(45) Date of Patent: Nov. 11, 2025

(54) DETERMINATION APPARATUS, DETERMINATION METHOD, AND PROGRAM

(71) Applicants: KABUSHIKI KAISHA TOSHIBA, Tokyo (JP); Toshiba Digital Solutions Corporation, Kawasaki (JP)

(72) Inventors: Ken Ishii, Tokyo (JP); Jun Takahashi, Tokyo (JP); Hiroki Takenouchi, Tokyo (JP); Hitoshi Kobayashi, Tokyo (JP); Takashi Kusakabe, Tokyo (JP); Yuto Akimoto, Kanagawa (JP)

(73) Assignees: KABUSHIKI KAISHA TOSHIBA, Tokyo (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 328 days.

(21) Appl. No.: 18/151,636

(22) Filed: Jan. 9, 2023

(65) Prior Publication Data

US 2023/0162506 A1 May 25, 2023

Related U.S. Application Data

(63) Continuation of application No. PCT/JP2021/024912, filed on Jul. 1, 2021.

(30) Foreign Application Priority Data

Jul. 16, 2020 (JP) .................. 2020-122362

(51) Int. Cl.
*G06K 9/00* (2022.01)
*G06V 20/52* (2022.01)

(52) U.S. Cl.
CPC .................. *G06V 20/53* (2022.01)

(58) Field of Classification Search
CPC .................. G06Q 10/063114; G06V 20/53
See application file for complete search history.

(56) References Cited

U.S. PATENT DOCUMENTS

2016/0219411 A1   7/2016  Tenant de la Tour et al.
2017/0024531 A1*  1/2017  Malaviya ............... G16H 50/30
(Continued)

FOREIGN PATENT DOCUMENTS

JP    4218669 B2    2/2009
JP    5107206 B2   12/2012
(Continued)

OTHER PUBLICATIONS

International Search Report dated Sep. 28, 2021, in corresponding International Application No. PCT/JP2021/024912, 5 pages.
(Continued)

*Primary Examiner* — Avinash Yentrapati
(74) *Attorney, Agent, or Firm* — Maier & Maier, PLLC (57) ABSTRACT

According to an embodiment, a determination apparatus for determining congestion of persons includes a first database, a stay information acquisition unit, and a first determination unit. The database stores position information indicative of a position of a person together with time information, in association with identification information of the person. The acquisition unit acquires information on one or more persons who have made a stay and to acquire, for each of the one or more persons who have made a stay, information on a time slot during which the stay was made, based on the position information and the time information stored in the first database in association with the identification information of the each of the one or more persons. The determination unit determines that an area in which multiple people have stayed for a predetermined continuous time length or more is a congested area.

12 Claims, 11 Drawing Sheets

(56) References Cited

U.S. PATENT DOCUMENTS

| | | | | |
|---|---|---|---|---|
| 2017/0124430 A1* | 5/2017 | Ohira | | G06V 20/53 |
| 2017/0132475 A1* | 5/2017 | Oami | | G06V 20/53 |
| 2018/0144320 A1* | 5/2018 | Gotanda | | G06Q 20/202 |
| 2019/0213422 A1* | 7/2019 | Funagi | | G06Q 30/0281 |
| 2020/0160708 A1* | 5/2020 | Kamiya | | G06V 20/53 |
| 2020/0226523 A1* | 7/2020 | Xu | | G06V 40/103 |
| 2021/0398691 A1* | 12/2021 | Dhamija | | G16H 50/80 |

FOREIGN PATENT DOCUMENTS

| | | |
|---|---|---|
| JP | 5198981 B2 | 5/2013 |
| JP | 6385613 B1 | 9/2018 |
| JP | 2018185224 A | 11/2018 |
| JP | 6520029 B2 | 5/2019 |
| JP | 2022002081 A | 1/2022 |
| WO | 2018138803 A1 | 8/2018 |

OTHER PUBLICATIONS

Extended Search Report issued on Jul. 5, 2024, in corresponding European Application No. 21842582.5, 7 pages.

* cited by examiner

| Minutes ▼ | V | W | X | Y | Z | (Worker) |
|---|---|---|---|---|---|---|
| 38.90 | 1 | | 1 | | | |
| 12.40 | 1 | | 1 | | 1 | |
| 11.00 | 1 | | | | 1 | |
| 10.50 | | 1 | | 1 | 1 | |
| 9.20 | 1 | 1 | | | | |
| 5.20 | 1 | | | 1 | | |
| 3.50 | | 1 | 1 | | | |
| 3.10 | | | 1 | 1 | | |
| 2.30 | 1 | 1 | 1 | 1 | 1 | |
| 2.10 | | 1 | | 1 | | |
| 1.70 | 1 | | 1 | | 1 | |
| 1.10 | 1 | 1 | | 1 | 1 | |
| 0.90 | 1 | 1 | 1 | | 1 | |
| 0.70 | 1 | 1 | 1 | 1 | 1 | |
| 0.60 | 1 | 1 | 1 | 1 | 1 | |
| 0.50 | 1 | 1 | | | 1 | |
| 0.40 | 1 | 1 | | 1 | 1 | |
| 0.30 | | 1 | | 1 | 1 | |
| 0.20 | 1 | | 1 | 1 | 1 | |
| 0.10 | | 1 | 1 | 1 | | |

DETERMINATION APPARATUS, DETERMINATION METHOD, AND PROGRAM

CROSS REFERENCE TO RELATED APPLICATIONS

This application is a Continuation application of PCT Application No. PCT/JP2021/024912, filed Jul. 1, 2021 and based upon and claiming the benefit of priority from prior Japanese Patent Application NO. 2020-122362, filed Jul. 16, 2020, the entire contents of all of which are incorporated herein by reference.

FIELD

Embodiments described herein relate generally to a determination apparatus, a determination method, and a program for determining congestion of persons, e.g., workers, in areas within a monitoring target region, e.g., a factory.

BACKGROUND

Layout optimization and traffic flow line optimization are essential for facilities having a limited premises area, such as a factory, to realize high production efficiency.

An inappropriate layout could disturb realization of efficient operations. Also, inappropriate traffic flow lines can lead to unnecessary congestion and proximity states of workers, which could degrade the operation efficiency.

Moreover, unnecessary congestion and proximity states of workers are undesirable from the viewpoint of prevention of infection with the novel coronavirus as well.

Objects intended herein include providing a determination apparatus, a determination method, and a program for determining congestion of persons such as workers in each area within a monitoring target region such as a factory.

DETAILED DESCRIPTION

According to an embodiment, a determination apparatus for determining congestion of persons in each area in a monitoring target region includes:

a first database configured to store position information indicative of a position of a person in the monitoring target region together with time information, in association with identification information of the person;

a stay information acquisition unit configured to acquire, for said each area, information on one or more persons who have made a stay and to acquire, for each of the one or more persons who have made a stay, information on a time slot during which the stay was made, based on the position information and the time information stored in the first database in association with the identification information of the each of the one or more persons; and a first determination unit configured to determine, based on a result acquired by the stay information acquisition unit, that an area in which multiple people have stayed for a predetermined continuous time length or more is a congested area.

Hereinafter, embodiments will be described with reference to the drawings.

A description will be given of a determination apparatus to which a determination method according to an embodiment is applied.

Figure 1:
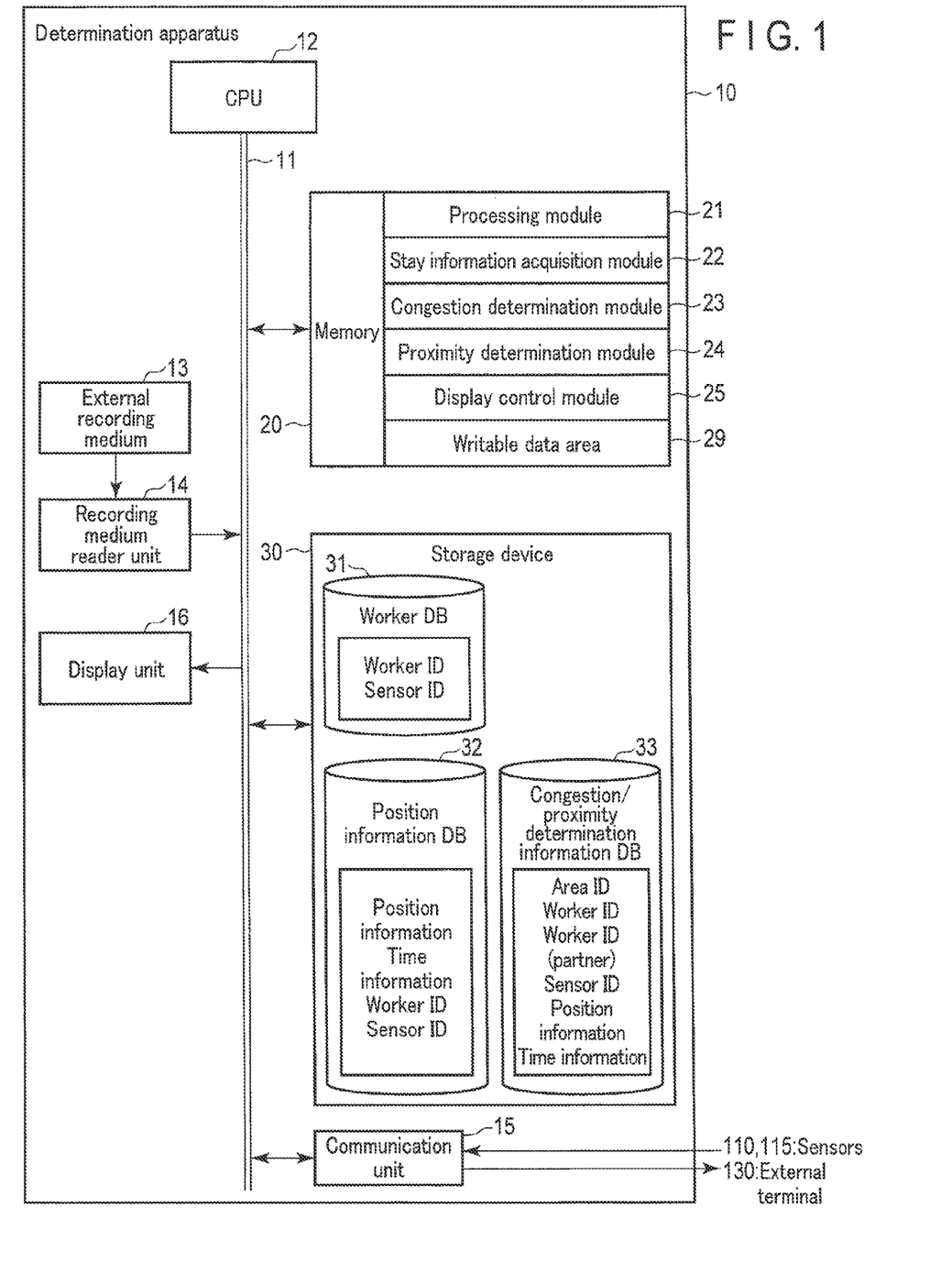
FIG. 1 is a block diagram showing an exemplary electronic circuitry configuration of a determination apparatus to which a determination method according to an embodiment is applied.

FIG. 1 is a block diagram showing an exemplary electronic circuitry configuration of a determination apparatus to which a determination method according to an embodiment is applied.

This determination apparatus 10 is an apparatus to determine congestion, proximity, etc. of persons in a monitoring target region.

The description of the embodiment will assume, without intending any limitation, instances where the monitoring target region is a factory and the persons are factory workers.

As shown in FIG. 1, the electronic circuitry of the determination apparatus 10 includes a CPU 12, a recording medium reader unit 14, a communication unit 15, a display unit 16 (e.g., a display), a memory 20, and a storage device 30, which are connected to one another via a bus 11.

The memory 20 stores a processing module 21, a stay information acquisition module 22, a congestion determination module 23, a proximity determination module 24, and a display control module 25, in the form of a program or programs for realizing the determination apparatus 10.

These program modules 21 to 25 may be stored in advance in the memory 20 or may be read from an external recording medium 13, which may be a memory card or the like, via the recording medium reader unit 14, and stored in the memory 20. The program modules 21 to 25 are adapted to be non-rewritable.

In addition to such user-non-rewritable memory areas, the memory 20 secures a writable data area 29 as a memory area for storing rewritable data.

The CPU 12 is one example of a processor or processors available for executing each of the program modules 21 to 25, and it controls operations of each circuitry component according to each of the program modules 21 to 25.

Figure 2:
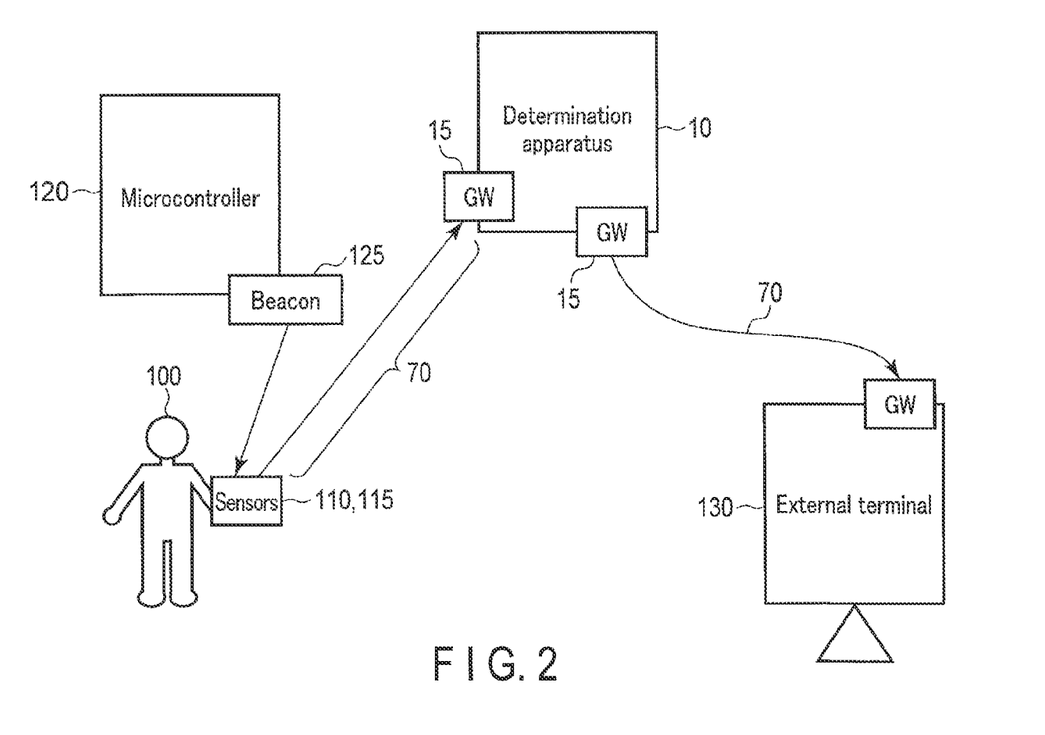
FIG. 2 is a conceptual diagram showing one example of connection relationships of the determination apparatus to other devices.

FIG. 2 is a conceptual diagram showing one example of connection relationships of the determination apparatus to other devices.

A position sensor 110 with a unique sensor ID is attached to each worker 100.

The position sensor 110 measures the position of the worker 100 by means of a GPS function, a WiFi function, or a beacon 125 and sends the position information based on the measurement together with the sensor ID to the determination apparatus 10 via a communication network 70.

Instead of or in addition to such a position sensor 110, an image sensor 115, which may be a camera or the like, may be attached to each worker 100. The image sensor 115 is likewise assigned a unique sensor ID.

The image sensor 115 acquires an image along the line of sight of each worker 100 and sends the acquired image information together with the sensor ID to the determination apparatus 10 via the communication network 70.

The storage device 30 includes a worker database 31, a position information database 32, and a congestion/proximity determination information database.

The worker database 31 stores a worker ID (for example, an employee number or the like) of each worker 100. Also, the worker database 31 stores the sensor IDs of the position sensor 110 and the image sensor 115 attached to each worker 100, in association with the worker ID of the corresponding worker 100.

The position information database 32 is a database for storing position information on each worker 100 in the factory together with time information, in association with the worker ID of the worker 100.

The congestion/proximity determination information database is a database for storing information related to results of determinations by the congestion determination module 23 and the proximity determination module 24.

The storage device 30 storing these databases 31 to 33 is constituted by, for example, a solid state drive (SSD), a hard disk drive (HDD), etc.

The communication unit 15 is connected to the communication network 70 so that it receives position information sent from the position sensor 110 and image information sent from the image sensor 115 together with their sensor IDs via the communication network 70 and so that it outputs the received position information or image information to the processing module 21 together with the sensor ID.

FIG. 2 shows, as one example, a case where the position information (and/or the image information) from the position sensor 110 (and/or the image sensor 115) is received via the communication network 70 by the communication unit 15 implemented by a gateway.

Also, in order to have a monitoring result, etc., which are for display on the display unit 16 by the display control module 25, displayed through an external terminal 130, the communication unit 15 may output data necessary for displaying the monitoring result, etc. to the external terminal 130 via the communication network 70 as shown in FIG. 2.

The processing module 21, in response to the position information and the sensor ID being output from the communication unit 15, acquires the worker ID associated with this sensor ID from the worker database 31 and outputs the worker ID together with the position information and the sensor ID to the position information database 32.

Also, the processing module 21, in response to the image information and the sensor ID being output from the communication unit 15, acquires the worker ID associated with this sensor ID from the worker database 31 and additionally extracts position information from the image information using, for example, AI. The processing module 21 then similarly outputs the worker ID together with the extracted position information and the sensor ID to the position information database 32.

The position information database 32 stores the position information output from the processing module 21 in association with time information, the worker ID, and one or more sensor IDs. The position information may be expressed in the form of coordinates which are obtainable through, for example, the three-point positioning technique using a Bluetooth (registered trademark) beacon, etc. As the time information, the position information database 32 may use time information measured by an internal clock (not illustrated) of the determination apparatus 10 or time information synchronized with a clock (time measurement means) of an external system connected to the determination apparatus 10.

The stay information acquisition module 22 acquires, for each area in the factory, information on one or more workers 100 who have made a stay there and also acquires, for each worker 100 who has made a stay, information on a time slot during which the stay was made, from the position information database 32 based on the position information and the time information stored in association with the worker IDs.

The congestion determination module 23 determines, based on the result acquired by the stay information acquisition module 22, an area in which multiple people have stayed for a predetermined continuous length of time (for example, 15 minutes) or more as an area of high congestion (which may be called a "congested area" below).

The proximity determination module 24 determines, for each area, multiple workers 100 who are staying close to one another within a predetermined proximity distance (for example, 1 m) or shorter, and a time slot during which each of such workers 100 continuously stays within this proximity distance or shorter, based on the position information and the time information stored in the position information database 32 in association with the worker IDs.

The proximity determination module 24 further determines that the workers 100 are in a state of proximity to each other, if a time length corresponding to the determined time slot is equal to or greater than a predetermined continuous time length (for example, 15 minutes).

To this end, the proximity determination module 24 calculates, for the multiple workers 100 concurrently staying in one area, a proximity distance from one another in a given time based on the position information and the time information stored in the position information database 32.

Figure 3:
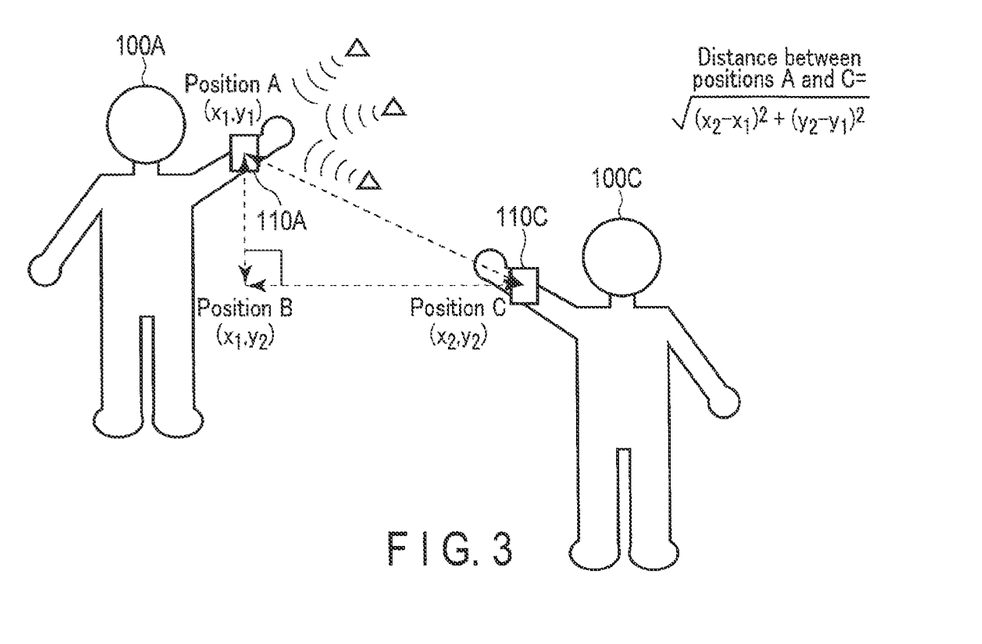
FIG. 3 is an example for illustrating a method of calculating a proximity distance between two workers using a trigonometric function.

The proximity distance between two workers may be calculated using, for example, a trigonometric function.

FIG. 3 is an example for illustrating a method of calculating a proximity distance between two workers using a trigonometric function.

A worker 100A and a worker 100C each wear a position sensor 110 of a wristwatch type.

The position information database 32 stores position information $(x_1, y_1)$ for position A of the worker 100A at a given timing and position information $(x_2, y_2)$ for position C of the worker 100C.

In this case, the proximity determination module 24 calculates the distance between the position A of the worker 100A and the position C of the worker 100C according to the following formula.

$$((x_2-x_1)^2+(y_2-y_1)^2)^{(1/2)}$$

Note that this formula assumes the workers 100A and 100C to be comparable in height, and handles them in two dimensions of x and y coordinates. However, they may be handled in three dimensions by extending the two dimensions to three dimensions of x, y, and z coordinates and conducting a similar mathematical procedure. Note also that, since the distance between the position A and the position C is small, calibration that takes into account the arc of the earth is not required.

In this manner, the proximity determination module 24 is able to calculate the distance between workers in a given time. Therefore, the proximity determination module 24 can determine workers 100 (e.g., the worker 100A and the worker 100C) who have been continuously close to each other for, for example, 15 minutes or longer, that is, the workers 100 who satisfy the proximity condition.

The proximity determination module 24 stores, for each area, and in the congestion/proximity determination information database, the worker IDs of the respective workers 100 (e.g., the worker 100A and the worker 100C) determined to be satisfying the proximity condition, in association with the time information and the position information corresponding to the time slot and the positions determined for these workers 100 (e.g., the worker 100A and the worker 100C) and representing the continuous stay within the proximity distance or shorter.

Figure 4:
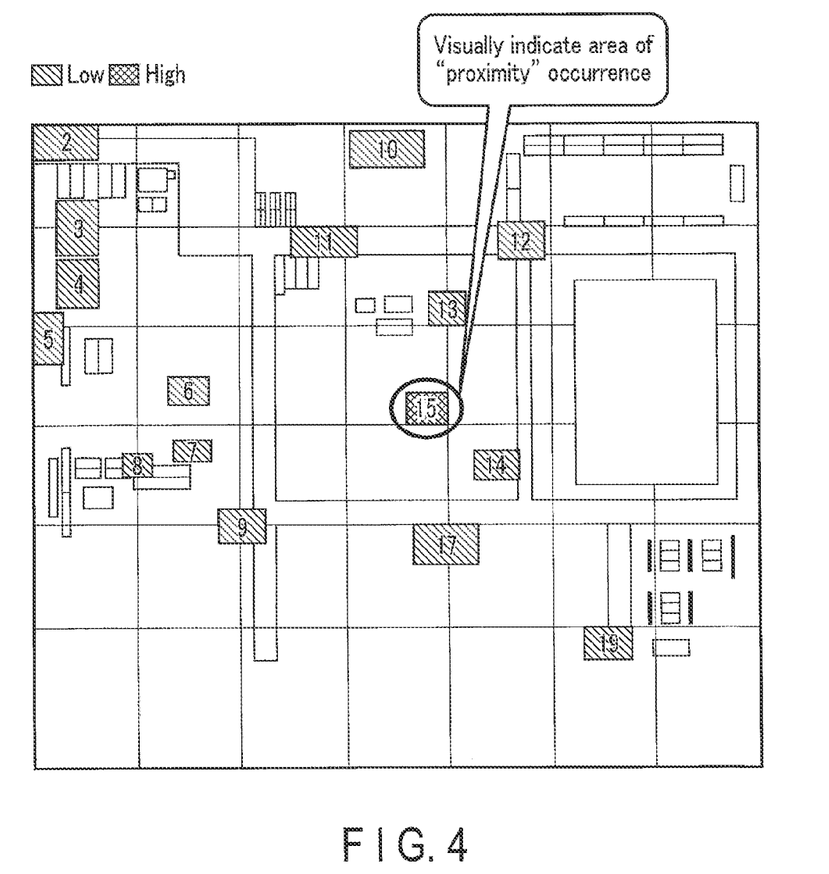
FIG. 4 is a plan view showing an internal layout of a factory, which is one example of what is displayed on a screen with a total value of proximity time for each area.
Figure 5:
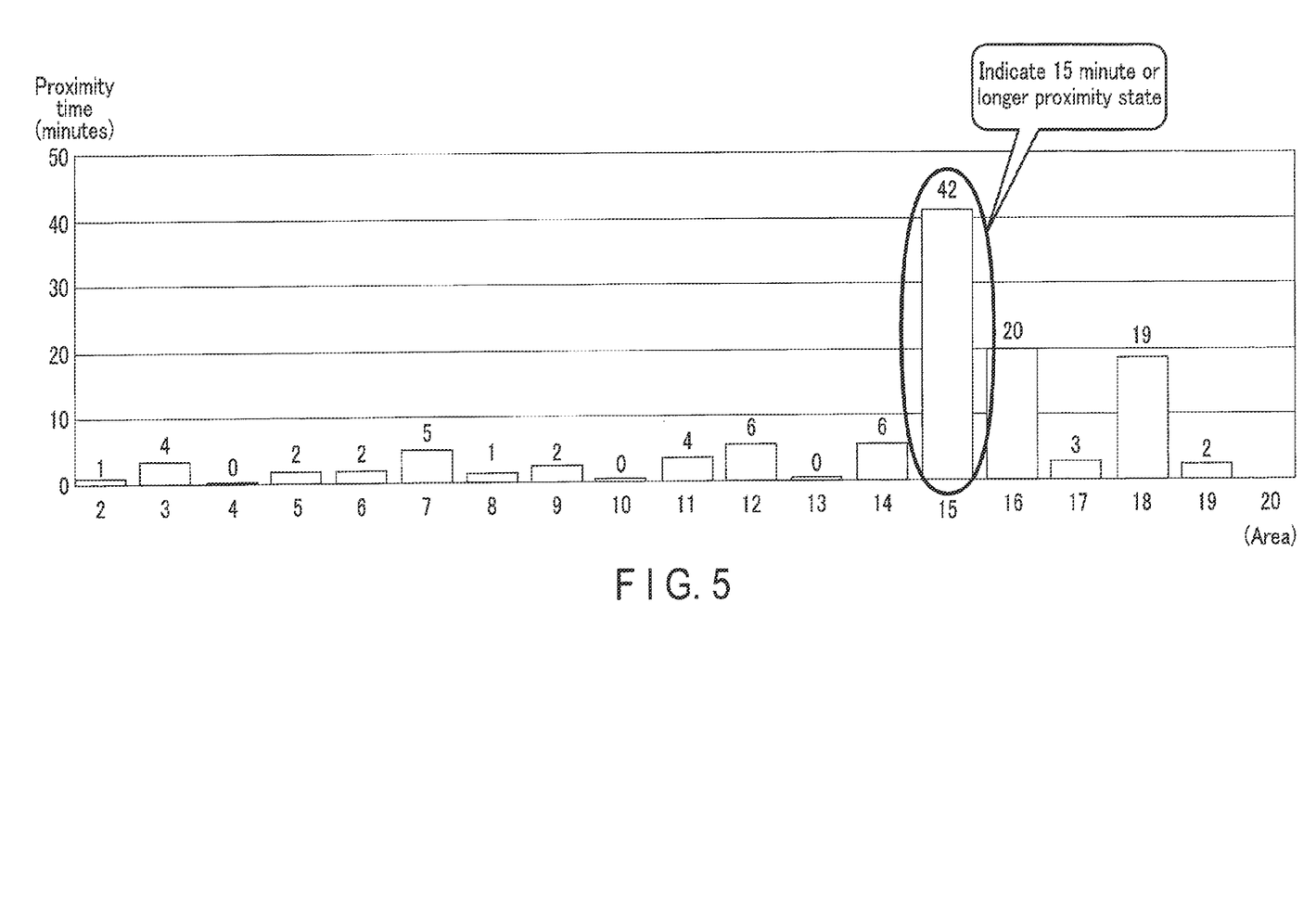
FIG. 5 is a diagram showing another example of what is displayed on the screen with a total value of proximity time for each area.

The display control module 25, based on the information stored in the congestion/proximity determination information database 33, causes the display unit 16, or the external terminal 130 via the communication network 70, to display through a display screen a factory map showing each area with a clear indication of the total value of the lengths of time for which the workers 100 determined to be satisfying the proximity condition have continuously stayed within the proximity distance or shorter. FIGS. 4 and 5 each show an example of this.

FIG. 4 is a plan view showing an internal layout of the factory, which is one example of what is displayed on the screen with the total value of proximity time for each area.

FIG. 4 applies hatching to each of the areas of which the total value of proximity time is equal to or greater than 0. In each area with hatching, the total value is displayed based on the number in units of "minutes". Note that the areas may be divided into two groups according to their total values, and in such instances, areas shown with two-direction hatching are areas belonging to a group with large total values, and areas shown with single-direction hatching are areas belonging to a group with small total values. Additionally, the circled item "15" is an area ID for identifying the area.

FIG. 5 is a diagram showing another example of what is displayed on the screen with the total value of proximity time for each area.

In FIG. 5, the horizontal axis indicates areas and the vertical axis indicates proximity time (minutes). For example, as indicated by the circle in the figure, the area "15" has a proximity time of 42 (minutes) in total, and it is understandable that the proximity time is continuous for 15 minutes or longer.

Figure 6:
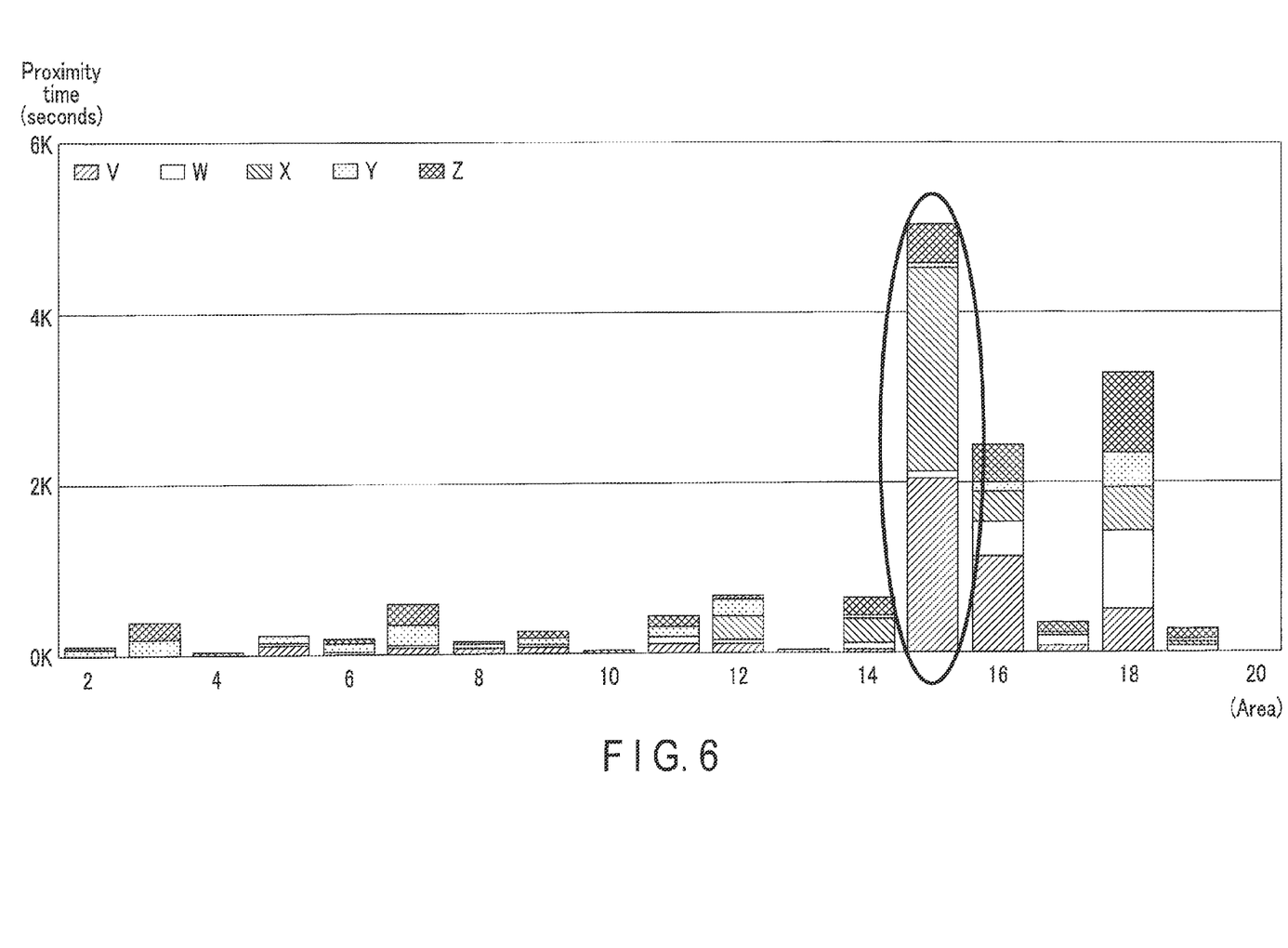
FIG. 6 is a diagram showing an example of what is displayed on the screen with a worker-by-worker breakdown of the total value of proximity time for each area.
Figure 7:
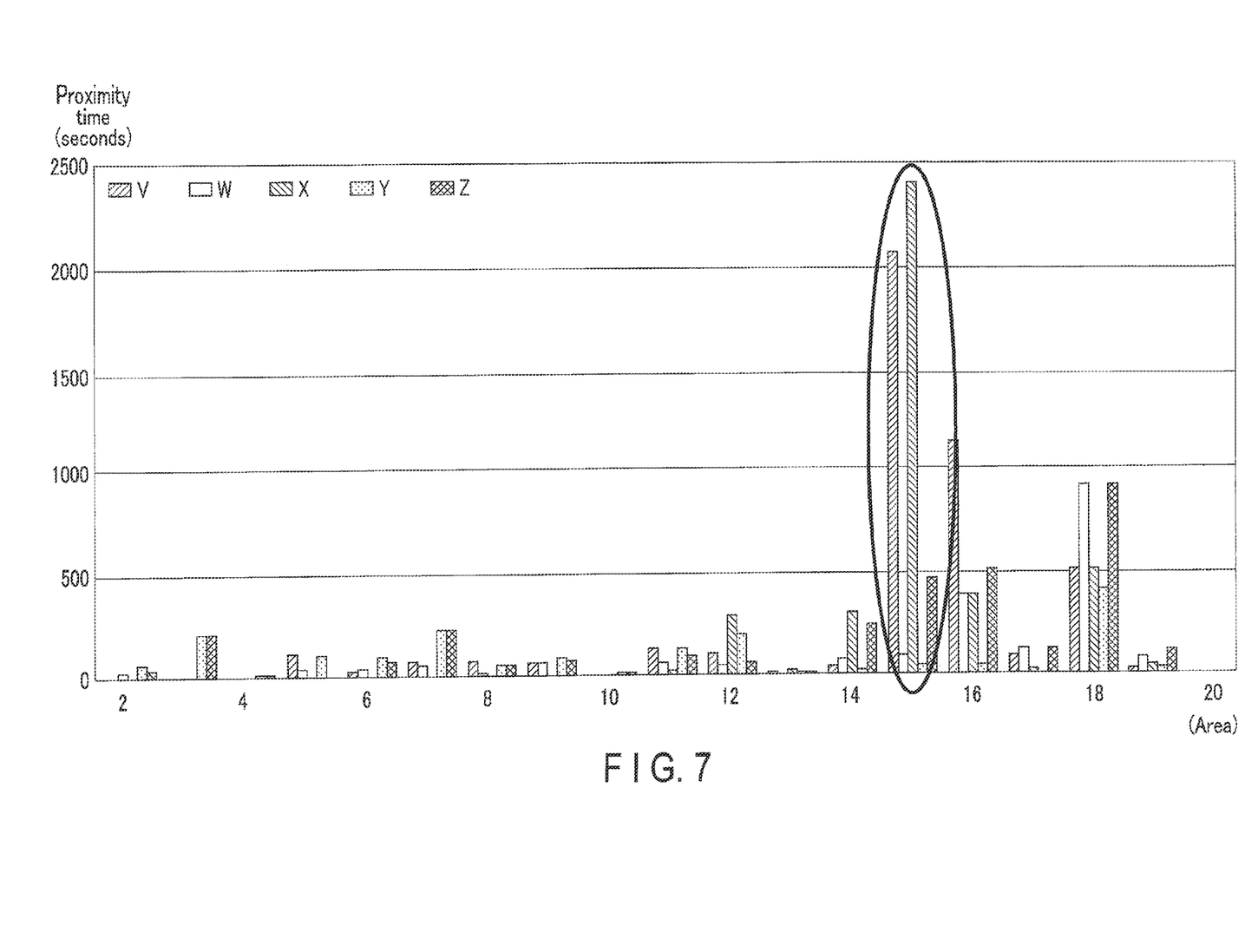
FIG. 7 is a diagram showing another example of what is displayed on the screen with a worker-by-worker breakdown of the total value of proximity time for each area.

The display control module 25 may also cause the display unit 16, or the external terminal 130 via the communication network 70, to display through the display screen an object as illustrated by FIG. 5 but with a worker-by-worker breakdown of the proximity time shown. FIGS. 6 and 7 each show an example of this.

FIG. 6 is a diagram showing an example of what is displayed on the screen with a worker-by-worker breakdown of the total value of proximity time for each area.

FIG. 7 is a diagram showing another example of what is displayed on the screen with a worker-by-worker breakdown of the total value of proximity time for each area.

In each of FIGS. 6 and 7, the horizontal axis indicates areas and the vertical axis indicates proximity time (minutes).

Figure 8:
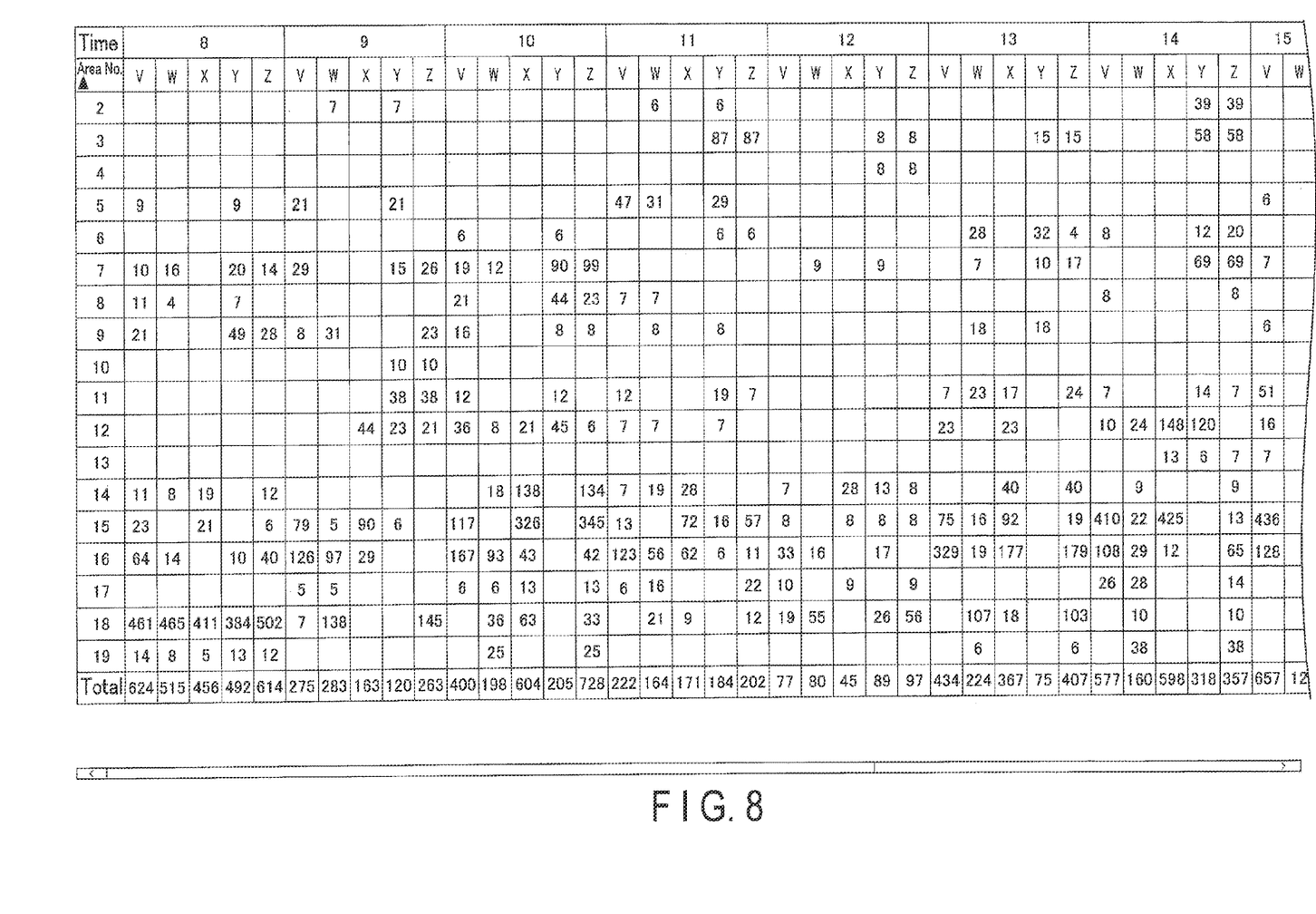
FIG. 8 is a table showing one example of what is displayed on the screen with, for each worker and for each time slot, the breakdown of the total value of proximity time shown in FIGS. 6 and 7.

The display control module 25 may further cause the display unit 16, or the external terminal 130 via the communication network 70, to display through the display screen an object as illustrated by FIGS. 6 and 7 but with a breakdown of the total value of proximity time given for each time slot. FIG. 8 shows an example of this.

FIG. 8 is a table showing one example of what is displayed on the screen with, for each worker and for each time slot, the breakdown of the total value of proximity time shown in FIGS. 6 and 7.

In FIG. 8, the vertical axis indicates areas. The horizontal axis indicates, along the first row, time slots and, along the second row, workers.

The numerical values shown in FIG. 8 are proximity time values of the respective workers, which are given in units of minutes and displayed one by one for each area and each time slot.

Note that FIG. 8 employs a table format as a mere example of the display format in which the breakdown of the total value of proximity time shown in FIGS. 6 and 7 is presented for each worker and each time slot. Other display formats including a graph format may also be employed.

Figure 9:
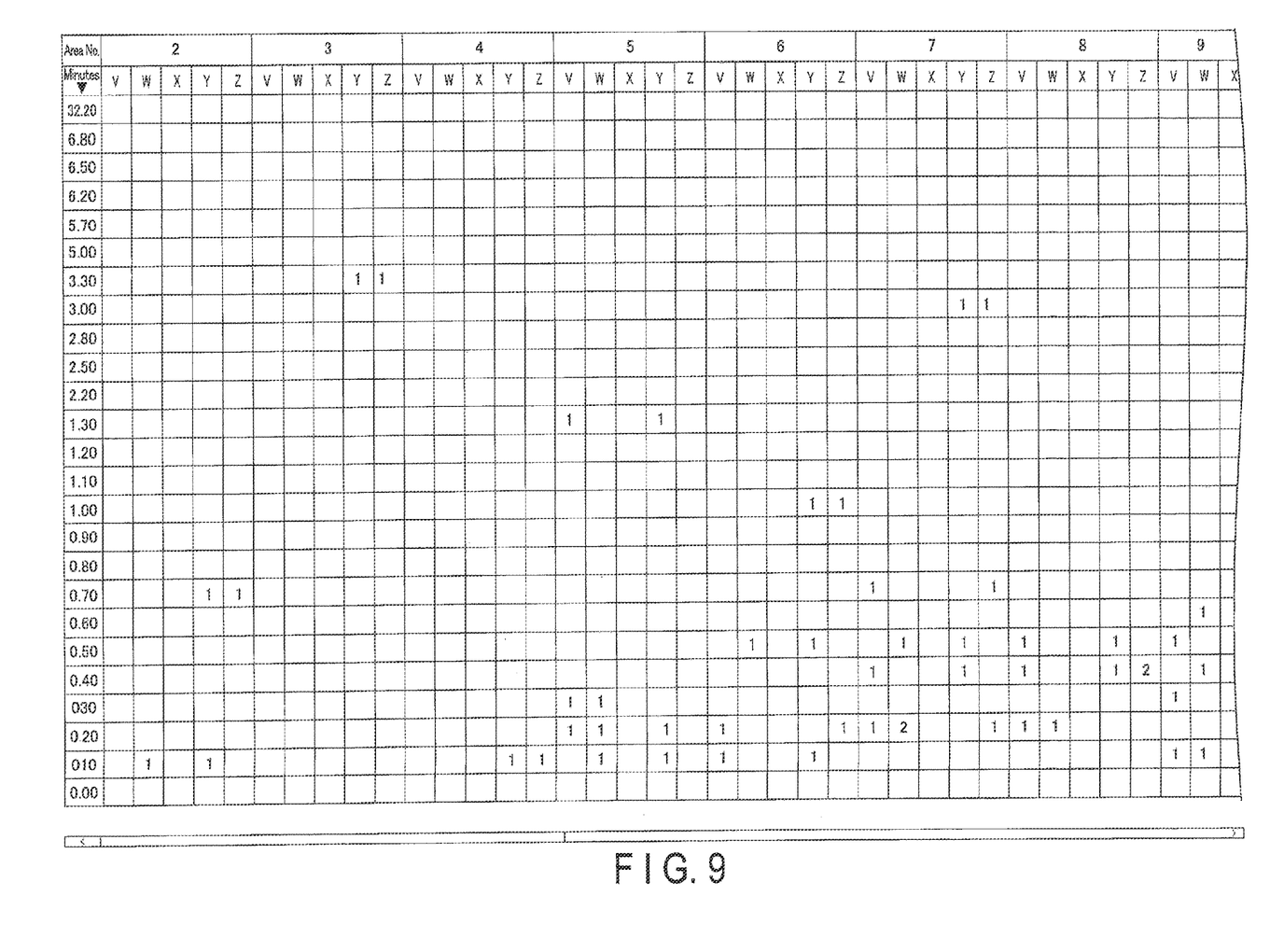
FIG. 9 is a table showing an example of what is displayed on the screen with, for each area, a clear indication of each worker determined to be in a proximity state and its proximity time.

The display control module 25, based on the information stored in the congestion/proximity determination information database, may further cause the display unit 16, or the external terminal 130 via the communication network 70, to display through the display screen a clear indication of, for each area, each of the workers 100 determined to have stayed there in a state of proximity to one another within the proximity distance or shorter, together with the proximity time. FIG. 9 shows an example of this.

FIG. 9 is a table showing an example of what is displayed on the screen with, for each area, a clear indication of each worker 100 determined to have stayed there in a proximity state and its proximity time.

In FIG. 9, the vertical axis indicates proximity time (minutes). The horizontal axis indicates, along the first row, areas and, along the second row, workers.

The numerical value "1" shown in FIG. 9 indicates the worker 100 who stayed in the area indicated by the horizontal axis, for the time indicated by the vertical axis.

Note that FIG. 9 employs a table format as a mere example of the display format in which the workers 100 determined to have stayed in an area in a state of proximity to one another within the proximity distance or shorter, that is, the workers 100 determined to be in a proximity state, are clearly indicated together with the proximity time for each area. Other display formats including a graph format may also be employed.

Figure 10:
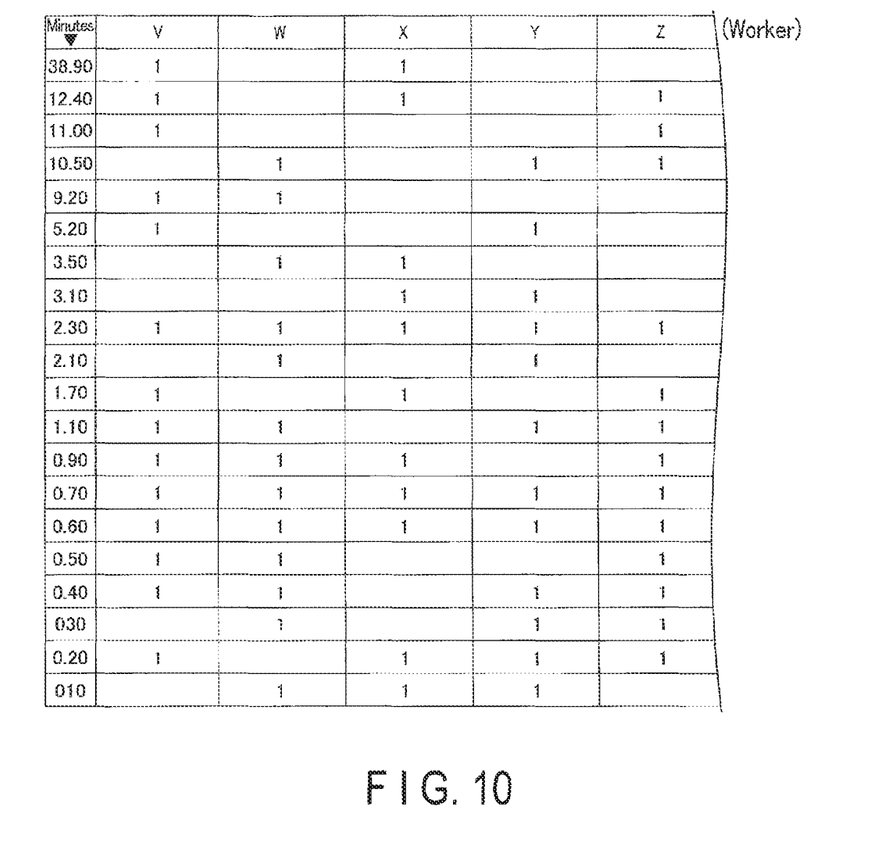
FIG. 10 is a table showing an example of what is displayed on the screen with a clear indication of each worker determined to be in a proximity state and its proximity time.

Furthermore, the display control module 25 may cause the display unit 16, or the external terminal 130 via the communication network 70, to display through the display screen a simplified object as shown in FIG. 10, which is obtained from an object as shown in FIG. 9. FIG. 10 shows an example of this.

FIG. 10 is a table showing an example of what is displayed on the screen with a clear indication of each worker 100 determined to be in a proximity state and the proximity time lengths.

In FIG. 10, the vertical axis indicates proximity time (minutes) and the horizontal axis indicates workers.

The numerical value "1" shown in FIG. 9 indicates a worker 100 who stayed for the proximity time indicated by the vertical axis. FIG. 10 is a version where the areas indicated along the first row of the horizontal axis in FIG. 9 are ignored and the display object is limited to only the workers.

Figure 11:
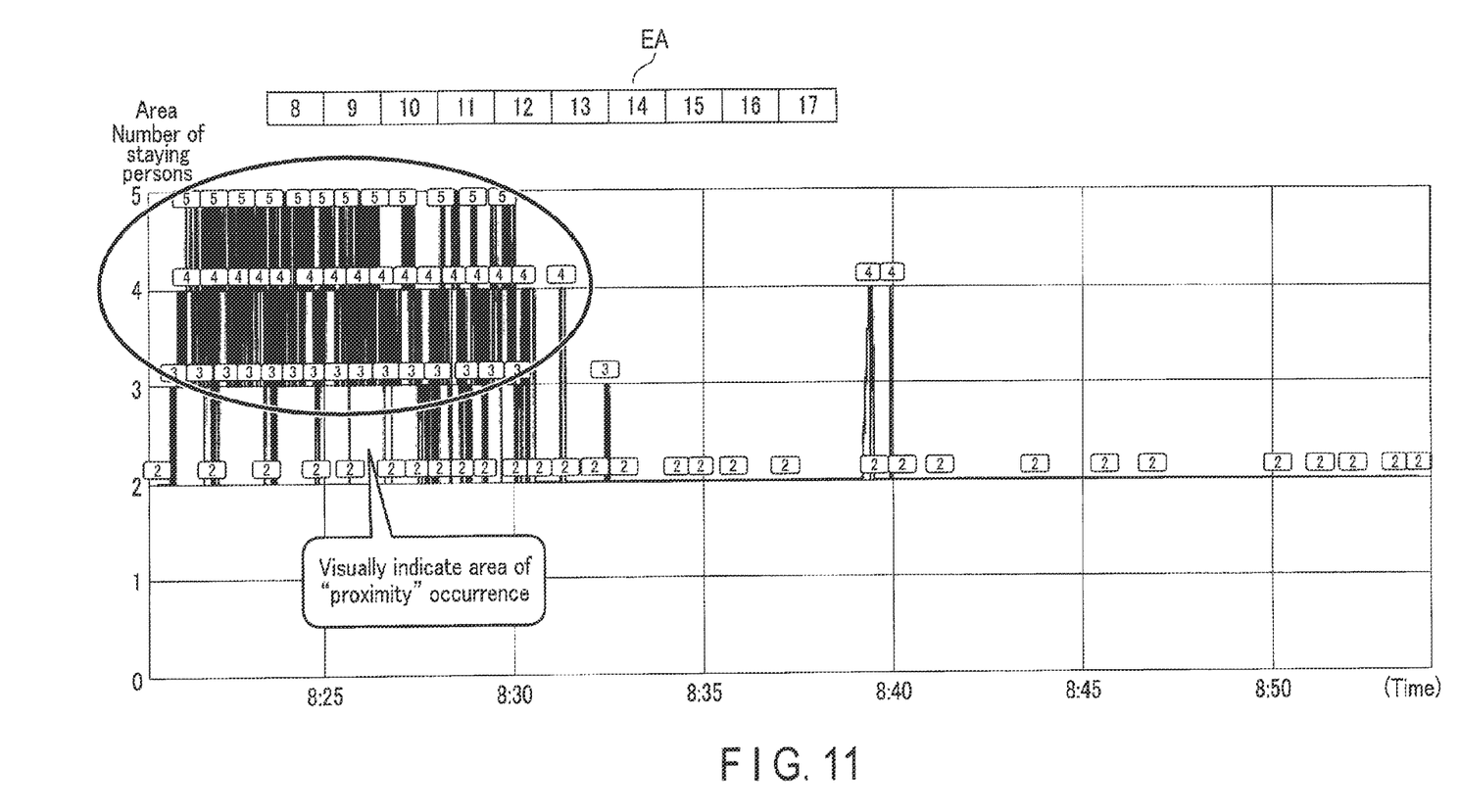
FIG. 11 is a diagram showing one example of what is displayed on the screen with a clear indication of a history of changes in the number of persons determined to be in a proximity state in a given area.

The display control module 25, based on the information stored in the congestion/proximity determination information database, may further cause, through the screen, area-by-area display of a clear indication of a history of changes in the number of persons determined to be in a proximity state. FIG. 11 shows an example of this.

FIG. 11 is a diagram showing one example of what is displayed on the screen with a clear indication of a history of changes in the number of persons determined to be in a proximity state in a given area.

In FIG. 11, the horizontal axis indicates time and the vertical axis indicates the number of persons who have made a stay.

In FIG. 11, solid lines represent changes in the number of persons determined to be in a proximity state. As indicated by the circle in the figure, time slots that involve many solid lines appear dark, which indicates that partners in the proximity relationship have frequently changed. Here, a larger height in the vertical direction means an increased number of partners in the proximity relationship. Therefore, it can be recognized that, if a large height in the vertical direction is displayed, many workers are in a state of proximity, and if the size of the dark part is large, the workers frequently move in and move out. That is, the time slots and the degrees of proximity occurrence can be presented visually.

Additionally, FIG. 11 also shows display of an area selection button EA. Users may designate a desired area through the area selection button EA so that the display object is switched to the history of changes for the designated area.

The congestion/proximity determination information database stores, for each area, the worker IDs of the respective workers 100 determined to be satisfying the proximity condition, and also the time information and the position information corresponding to the time slots and the positions determined for these workers 100 and representing the stay in each area in a proximate state. Thus, this enables the display control module 25 to cause the display actions on the screen as illustrated in FIGS. 4 to 11, based on the information stored in the congestion/proximity determination information database.

Next, a description will be given of an exemplary operation of the determination apparatus configured as above, to which the determination method according to an embodiment is applied.

Figure 12:
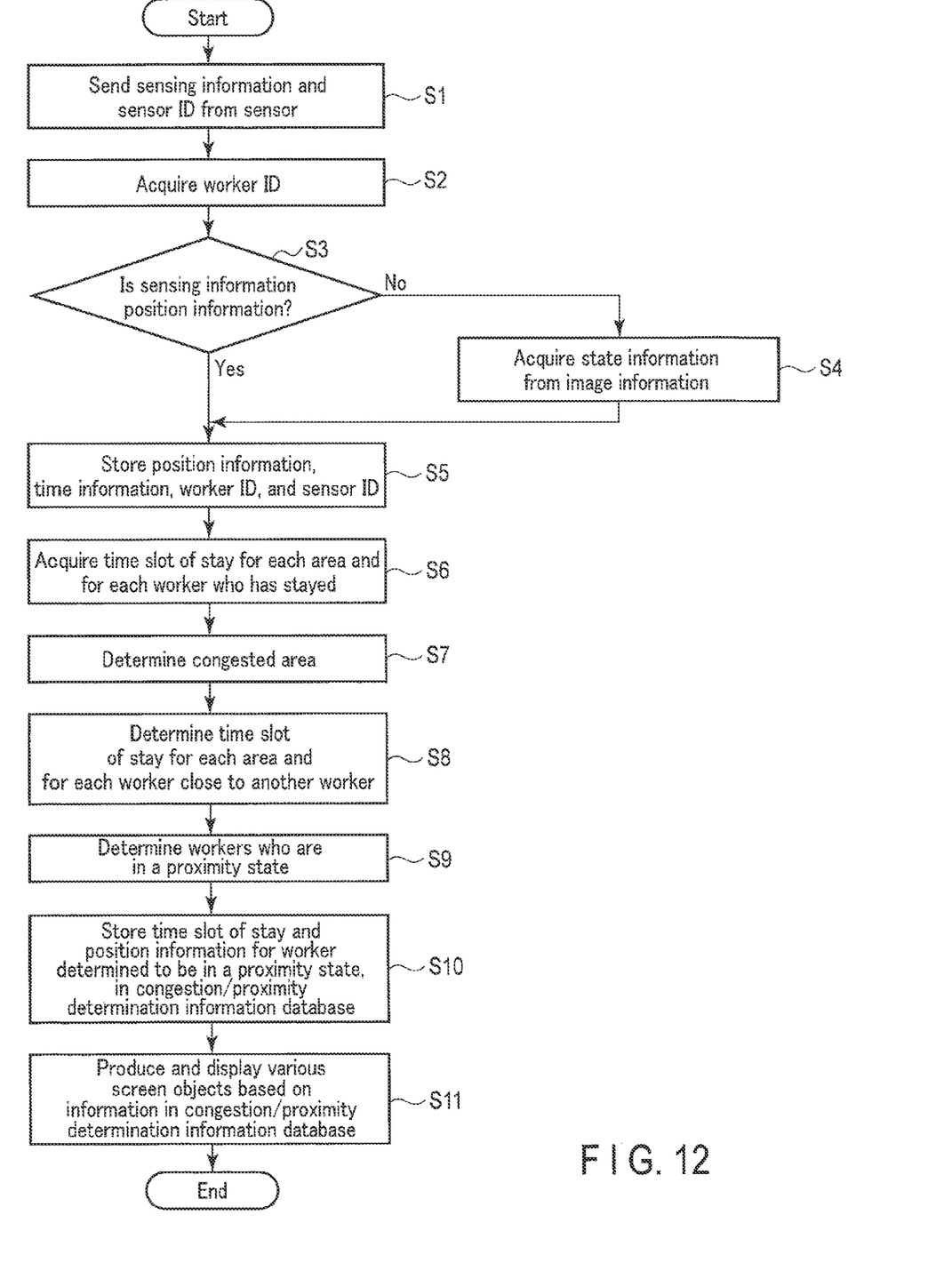
FIG. 12 is a flowchart showing an exemplary operation of the determination apparatus to which the determination method according to the embodiment is applied.

FIG. 12 is a flowchart showing an exemplary operation of the determination apparatus to which the determination method according to the embodiment is applied.

A position sensor 110 with a unique sensor ID is attached to each worker 100. Instead of or in addition to the position sensor 110, the image sensor 115, which may be a camera or the like, may be attached to each worker 100.

The position information on each worker 100 measured by the position sensor 110, i.e., sensing information obtained by the position sensor 110, is sent from the position sensor 110 to the determination apparatus 10 together with the sensor ID. The image information acquired by the image sensor 115, i.e., sensing information obtained by the image sensor 115, is also sent from the image sensor 115 to the determination apparatus 10 via the communication network 70, together with the corresponding sensor ID (S1).

The position information, i.e., sensing information, and the sensor ID from the position sensor 110, as well as the image information, i.e., sensing information, and the sensor ID from the image sensor 115, are received by the communication unit 15 in the determination apparatus 10, and then output from the communication unit 15 to the processing module 21.

The processing module 21, in response to the position information and the sensor ID being output from the communication unit 15, acquires the worker ID associated with this sensor ID from the worker database 31. The processing module 21, in response to the image information and the sensor ID being output from the communication unit 15, likewise acquires the worker ID associated with this sensor ID from the worker database 31 (S2).

Then, if the sensing information sent in step S1 is the position information (S3: Yes), the processing module 21 outputs the worker ID acquired in step S2 to the position information database 32 together with the position information and the corresponding sensor ID, whereby the position information is stored in the position information database 32 in association with the worker ID, the sensor ID, and also time information (S5).

On the other hand, if the sensing information sent in step S1 is the image information (S3: No), the processing module 21 acquires position information from the image information using, for example, AI (S4). The processing module 21 then outputs the worker ID acquired in step S2 to the position information database 32 together with the position information acquired in step S4 and the corresponding sensor ID, whereby this position information is stored in the position information database 32 in association with the worker ID, the sensor ID, and also time information (S5).

Next, the stay information acquisition module 22 acquires, for each area in the factory, information on one or more workers 100 who have made a stay there and also acquires, for each worker 100 who has made a stay, information on a time slot during which the stay was made, from the position information database 32 based on the position information and the time information stored in association with the worker IDs (S6).

Next, the congestion determination module 23 determines, based on the result acquired by the stay information acquisition module 22, that an area in which multiple people have stayed for a predetermined continuous time length (for example, 15 minutes) or more is a congested area (S7).

Next, the proximity determination module 24 determines, for each area, the workers 100 (e.g., the worker 100A and the worker 100C shown in FIG. 3) who are staying close to one another within a predetermined proximity distance (for example, 1 m) or shorter, and a time slot during which each of such workers 100 (e.g., the worker 100A and the worker 100C shown in FIG. 3) continuously stays, based on the position information and the time information stored in the position information database 32 in association with the worker (S8).

The proximity determination module 24 further determines that the workers 100 (e.g., the worker 100A and the worker 100C shown in FIG. 3) staying close to one another within the predetermined proximity distance or shorter are in a state of proximity to each other, if the time length corresponding to the determined time slot is equal to or longer than a predetermined continuous time length (for example, 15 minutes) (S9).

To this end, the proximity determination module 24 calculates, for the multiple workers 100 concurrently staying in one area, a proximity distance from one another in a given time, based on the position information and the time information stored in the position information database 32 and using, for example, a trigonometric function.

Then, the proximity determination module 24 stores, for each area, and in the congestion/proximity determination information database, the worker IDs of the respective workers 100 (e.g., the worker 100A and the worker 100C) determined to be satisfying the proximity condition, in association with the time information and the position information corresponding to the time slot and the positions that have been determined for these workers 100 (e.g., the worker 100A and the worker 100C) and that represent the continuous stay within the proximity distance or shorter (S10).

Accordingly, the display control module 25 produces screen objects as illustrated in FIGS. 4 to 11 and causes the display unit 16, or the external terminal 130 via the communication network 70, to display them through the display screen, based on the information stored in the congestion/proximity determination information database (S11).

With a screen as illustrated in FIG. 4, it is possible to visually comprehend areas where a proximity state has occurred.

With a screen as illustrated in FIG. 5, it is possible to comprehend the degree of proximity in an area where a proximity state has occurred, in comparison with other areas.

With a screen as illustrated in FIGS. 6 and 7, it is possible to independently comprehend which worker has been involved in a high degree of proximity.

With a screen as illustrated in FIG. 8, it is possible to comprehend, in detail, which worker has been involved in a high degree of proximity in which area and in which time slot.

With a screen as illustrated in FIG. 9, it is possible to comprehend which worker has been in a state of proximity with which worker, in which area and to what extent.

With a screen as illustrated in FIG. 10, it is possible to comprehend which worker has been in a state of proximity with which worker and to what extent.

With a screen as illustrated in FIG. 11, it is possible to visually comprehend time slots where a proximity state has occurred and its degree.

Therefore, according to the determination apparatus to which the determination method according to the embodiment is applied, it is possible to comprehend the state of congestion and proximity of persons such as workers in each area within a monitoring target region such as a factory, from various viewpoints.

While certain embodiments have been described, they have been presented by way of example only, and they are not intended to limit the scope of the inventions. These embodiments may be implemented in a variety of other forms with various omissions, substitutions, and changes without departing from the spirit of the inventions. The embodiments and their modifications are covered by the accompanying claims and their equivalents, as would fall within the scope and the gist of the claimed inventions.

What is claimed is:

1. A determination apparatus for determining congestion of persons in each area in a monitoring target region, the determination apparatus comprising:
    a position sensor or image sensor configured to acquire a position of each of one or more of the persons;
    a first database configured to receive from the position sensor or the image sensor the position of each of the one or more persons and to store position information indicative of each of the one or more persons in the monitoring target region together with time information, in association with identification information of each of the one or more persons;
    a stay information acquisition processor configured to acquire, for said each area, information on the each of the one or more persons who have made a stay and to acquire, for each of the one or more persons who have made a stay, information on a time slot during which the stay was made, based on the position information and the time information stored in the first database in association with the identification information of the each of the one or more persons;
    a first determination processor configured to determine, based on a result acquired by the stay information acquisition processor, that an area in which multiple people have stayed for a predetermined continuous time length or more is a congested area; and
    a display control processor configured to display a map of the monitoring target region and to display within the monitoring target region an indication of total values of time that the each of the one or more persons has stayed within a proximity of each other within each area in the monitoring target region.

2. The determination apparatus according to claim 1, further comprising a second determination processor configured to determine, for said each area, multiple people staying close to one another within a predetermined proximity distance or shorter, and a time slot during which each of the multiple people staying close to one another within the predetermined proximity distance or shorter continuously stays within the proximity distance or shorter.

3. The determination apparatus according to claim 2, wherein the second determination processor is further configured to determine that the multiple people staying close to one another within the predetermined proximity distance or shorter are in a state of proximity to each other, if a time length corresponding to the time slot is equal to or longer than the predetermined continuous time length.

4. The determination apparatus according to claim 2, further comprising a second database configured to store, for said each area, the identification information of each of the multiple people determined to be staying close to one another within the predetermined proximity distance or shorter, in association with the time information and the position information corresponding to the time slot and position that have been determined for the multiple people and that represent a continuous stay within the proximity distance or shorter.

5. The determination apparatus according to claim 4, wherein the display control processor is further configured to cause, based on information stored in the second database, a screen to be displayed with an indication of, for said each area, a total value of time lengths for which each of the multiple people determined to be staying close to one another within the predetermined proximity distance or shorter has continuously stayed within the proximity distance or shorter.

6. The determination apparatus according to claim 5, wherein the display control processor is further configured to display, on the screen, a breakdown of the total value person by person.

7. The determination apparatus according to claim 6, wherein the display control processor is further configured to display, on the screen, the breakdown of the total value time slot by time slot.

8. The determination apparatus according to claim 4, wherein the display control processor is further configured to cause, based on information stored in the second database, a screen to be displayed with an indication of, for said each area and time slot by time slot, the multiple people determined to be staying close to one another within the predetermined proximity distance or shorter.

9. The determination apparatus according to claim 2, wherein the display control processor is further configured to cause a screen to be displayed with an indication of, for an area determined to be the congested area, each of the multiple people determined to be staying close to one another within the predetermined proximity distance or shorter, together with a time length of the state of proximity.

10. The determination apparatus according to claim 4, wherein the display control processor is further configured to cause, based on information stored in the second database, a screen to be displayed with an indication of, for said each area, a history of changes in a number of the multiple people determined to be staying close to one another within the predetermined proximity distance or shorter.

11. A determination method performed by a determination apparatus for determining congestion of persons in each area in a monitoring target region, the determination method comprising:

acquiring by a position sensor or image sensor configured a position of each of one or more of the persons;

receiving from the position sensor or image sensor the position of each of the one or more persons and storing, in a first database, position information indicative of a position of each of the one or more persons in the monitoring target region together with time information, in association with identification information of the each of the one or more persons;

acquiring, for said each area, information on one or more persons who have made a stay and acquiring, for each of the each of the one or more persons who have made a stay, information on a time slot during which the stay was made, based on the position information and the time information stored in the first database in association with the identification information of the each of the one or more persons;

determining, based on a result of said acquiring, that an area in which multiple people have stayed for a predetermined continuous time length or more is a congested area; and controlling a display to display a map of the monitoring target region and to display within the monitoring target region an indication of total values of time that the each of the one or more persons has stayed within a proximity of each other within each area in the monitoring target region.

12. A non-transitory computer readable medium including a computer executable program for determining congestion of persons in each area in a monitoring target region, the program causing a computer to realize functions including:

a function of acquiring, by a position sensor or image sensor, a position of each of one or more of the persons;

a function of receiving from the position sensor or the image sensor the position of each of the one or more persons and storing, in a first database, position information indicative of a position of each of the one or more persons in the monitoring target region together with time information, in association with identification information of the each of the one or more persons;

a function of acquiring, for said each area, information on the each of the one or more persons who have made a stay and acquiring, for each of the one or more persons who have made a stay, information on a time slot during which the stay was made, based on the position information and the time information stored in the first database in association with the identification information of the each of the one or more persons;

a function of determining, based on a result of said acquiring, that an area in which multiple people have stayed for a predetermined continuous time length or more is a congested area; and a function of controlling a display to display a map of the monitoring target region and to display within the monitoring target region an indication of total values of time that the each of the one or more persons has stayed within a proximity of each other within each area in the monitoring target region.

* * * * *